(12) United States Patent
Parsio

(10) Patent No.: US 10,000,042 B2
(45) Date of Patent: Jun. 19, 2018

(54) TEARABLE POLYSTYRENE FILM LAMINATE FOR PACKAGING AND POUCH PURPOSES

(71) Applicant: Multi-Plastics, Inc., Lewis Center, OH (US)

(72) Inventor: M. David Parsio, Lake Forest, CA (US)

(73) Assignee: Multi-Plastics, Inc., Lewis Center, OH (US)

( * ) Notice: Subject to any disclaimer, the term of this patent is extended or adjusted under 35 U.S.C. 154(b) by 787 days.

(21) Appl. No.: 14/105,284

(22) Filed: Dec. 13, 2013

(65) Prior Publication Data

US 2014/0170401 A1  Jun. 19, 2014

Related U.S. Application Data

(60) Provisional application No. 61/737,289, filed on Dec. 14, 2012.

(51) Int. Cl.

| | |
|---|---|
| *B32B 27/08* | (2006.01) |
| *B32B 7/02* | (2006.01) |
| *B32B 27/20* | (2006.01) |
| *B32B 27/36* | (2006.01) |
| *B32B 27/32* | (2006.01) |
| *B32B 27/30* | (2006.01) |
| *B29K 25/00* | (2006.01) |

(52) U.S. Cl.
CPC ............... *B32B 27/08* (2013.01); *B32B 7/02* (2013.01); *B32B 27/20* (2013.01); *B32B 27/302* (2013.01); *B32B 27/306* (2013.01); *B32B 27/32* (2013.01); *B32B 27/36* (2013.01); *B29K 2025/06* (2013.01); *B32B 2250/246* (2013.01); *B32B 2264/02* (2013.01); *B32B 2264/10* (2013.01); *B32B 2270/00* (2013.01); *B32B 2307/518* (2013.01); *B32B 2307/54* (2013.01); *B32B 2307/582* (2013.01); *B32B 2307/704* (2013.01); *B32B 2439/02* (2013.01); *B32B 2439/70* (2013.01); *Y10T 428/24992* (2015.01); *Y10T 428/31913* (2015.04); *Y10T 428/31938* (2015.04)

(58) Field of Classification Search
None
See application file for complete search history.

(56) References Cited

U.S. PATENT DOCUMENTS

| | | | | |
|---|---|---|---|---|
| 5,834,126 A | * | 11/1998 | Sheu | ....................... B32B 25/08 428/515 |
| 2007/0082150 A1 | * | 4/2007 | Ginossatis | .............. B32B 27/08 428/35.2 |

* cited by examiner

*Primary Examiner* — Sheeba Ahmed
(74) *Attorney, Agent, or Firm* — Jason H. Foster; Kremblas & Foster

(57) ABSTRACT

The current disclosure relates to a polymeric laminate structure having an outer polystyrene film, either blown or cast, comprised of crystal polystyrene homopolymer, optionally blended with up to about 45 wt-% of high impact polystyrene and/or inorganic fillers.

7 Claims, 3 Drawing Sheets

TEARABLE POLYSTYRENE FILM LAMINATE FOR PACKAGING AND POUCH PURPOSES

CROSS-REFERENCE TO RELATED APPLICATIONS

This application claims benefit of provisional application Ser. No. 61/737,289, filed on Dec. 14, 2012, the disclosure of which is expressly incorporated herein by reference.

STATEMENT REGARDING FEDERALLY SPONSORED RESEARCH

Not applicable.

BACKGROUND

Films or sheets of polymeric barrier materials are formed into a finished package or "film package" such as a pouch by various techniques, for instance, by forming heat or adhesive seals about the periphery of the shape to be formed into a pouch. For example, if a square pouch is desired, a rectangular film twice the desired length of the pouch is folded, the two parallel sides of the periphery (perpendicular to the fold) heat or adhesive sealed, or, the two parallel sides and the fold are heat or adhesive sealed, the food or other material to be packaged inserted therein, and then the remaining open side of the periphery is heat or adhesive sealed. Another method for making a pouch is by sealing on three sides face-to-face films, filling the thus formed open pouch with food or whatever material is to be packaged therein, and then sealing the fourth side. For background on pouches or bags and their production, reference is made to U.S. Pat. Nos. 4,190,477, 4,311,742, 4,360,550, 4,424,256, 4,557,377, and 5,630,308, each of which is incorporated herein by reference.

The problem encountered by the end user of the food or material within the pouch is how to open the pouch. The pouches are usually formed from tough or strong polymeric barrier materials so the pouches do not open easily. One method for opening such pouches is to manually rip at the pouch, which usually results in its contents spilling all about. Another method is simply cutting open the pouch with a scissor, knife or other sharp object. It is desirable to be able to neatly open a pouch without the need to use a cutting instrument. Furthermore, the problem of how to open a pouch is really two-fold: The first problem is how to initiate the opening. The second problem is providing control of the opening across the entire pouch.

A variety of solutions have been proposed in the art and are summarized in U.S. Pat. No. 5,630,308, cited above. In fact, the '308 patent solves this problem by laser scoring the polymeric laminate structure so as to enable the pouch to be easily opened along one of the laser-created score lines. Of course, laser scoring adds another manufacturing step to the process, thus increasing cost of the ultimate pouch.

The present disclosure proposes to create inherent tearability during the laminate production process to enable facile hand tearing of the laminate structure, while reducing costs by not adding extra steps to the manufacturing process. The need for expensive lasers is eliminated also.

BRIEF SUMMARY

The current disclosure relates to a polymeric laminate structure having an outer polystyrene film, either blown or cast tentered, comprised of crystal polystyrene homopolymer, optionally blended with up to about 45 wt-% of high impact polystyrene and/or inorganic fillers.

It should be understood that the following abbreviations are used herein:
PST means "crystal" polystyrene,
LDPE means low density polyethylene,
HDPE means high-density polyethylene,
LLDPE means linear low-density polyethylene,
EAA means ethylene acrylic acid,
EMA means ethylene methyl acrylate.

BRIEF DESCRIPTION OF THE DRAWINGS

For a fuller understanding of the nature and advantages of the present media and process, reference should be had to the following detailed description taken in connection with the accompanying drawings, in which.

Figure 1:
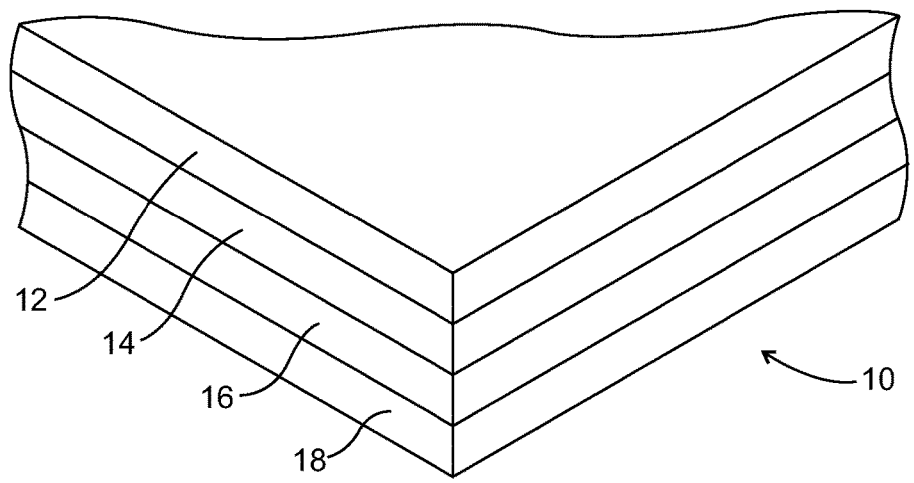
FIG. 1 illustrates a 4-layer laminate according to the disclosure.

The drawings will be further described below.

DETAILED DESCRIPTION

A polystyrene film either blown or cast tentered comprised of "crystal" polystyrene homopolymer (average MW of 300,000 units (g/mol) with a polydispersity index of about 2.6) and/or blends with both high impact polystyrene and/or inorganic fillers to yield a uniform thin film capable of lamination to other substrates by conventional methods. Specifically, a minimum of 55 wt-percent ("wt" being weight herein) homopolymer polystyrene blended with copolymer polystyrene containing uniformly dispersed butadiene as the "high impact" rubber phase and/or inorganic fillers to impart both strength and stiffness to the lamination film. The high impact copolymer polystyrene could also be dispersed mechanically through blending with homopolymer polystyrene at ratios between 0.5 to 25 weight percent, and further incorporated with additives such as calcium carbonate or other premixed additives and processing aids. The additives and fillers can be also pre-dispersed uniformly in a wide variety other compatible polymers such as but not limited to: polypropylene, high-density polyethylene, ethylene vinyl acetate copolymer, or polyethylene as suitable carrier media at ratios between 0.25 and 20 weight percent. The resultant extruded blend will be uniform in nature and yield a thin film possessing high stiffness and also minimum tensile properties required for lamination to other substrates.

The film structure can comprise, from outer layer to inner layer; a first layer comprising "crystal" polystyrene homopolymer and/or blends, a second layer comprising polyethylene, a third layer comprising high density polyethylene, and a fourth layer comprising linear low density polyethylene. Alternatively, the film structure can comprise, from outer layer to inner layer, a first layer comprising "crystal" polystyrene homopolymer and/or blends, a second layer comprising polyethylene, e.g., white polyethylene, a third layer comprising polyester, a fourth layer comprising polyethylene, e.g., white polyethylene and/or a block polymer or copolymer of polyethylene, a fifth layer comprising a co-extrusion which can be a sealant film comprising at least one high density polyethylene, e.g., orange colored high density polyethylene, and, a sixth layer comprising linear low density polyethylene, e.g., a clear linear low density polyethylene.

The film structures of this invention also can comprise:
(i) PST/INK/LDPE/PET/LDPF/Coextrusion of HDPE, HDPE, LLDPE; or PST/LDPE/PET/LDPE/Coextrusion of HDPE, HDPE, LLDPE;
(ii) PST/Coextrusion of LDPE, EAA/Foil/EMA; or PST/INK/Coextrusion of LDPE, EAA/Foil/Primer/EMA;
(iii) PST INK/Coextrusion of LDPE, LDPE/Coextrusion of HDPE, HDPE, LLDPE; or Polypropylene (e.g., OPP)/Coextrusion of LDPE/LDPE/Coextrusion of HDPE, HDPE, LLDPE;
(iv) PST/INK/LDPF/Coextrusion of HDPE, HDPE, LLDPE; or Polypropylene (e.g., OPP)/LDPE/Coextrusion of HDPE, HDPE, LLDPE;
(v) PST/HDPE/LLDPE, e.g., by Coextrusion.

Other preferred structure for the present invention include:
(i) PST/INK/LDPE/PET/LDPF/Coextrusion of HDPE, HDPE, LLDPE; or PET/LDPE/PET/LDPE/Coextrusion of HDPE, HDPE, LLDPE;
(ii) PST/Coextrusion of LDPE, EAA/Foil/EMA; or PET/INK/Coextrusion of LDPE, EAA/Foil/Primer/EMA;
(iii) PST/INK/Coextrusion of LDPE, LDPE/Coextrusion of HDPE, HDPE, LLDPE; or Polypropylene (e.g., OPP) Coextrusion of LDPE, LDPE/Coextrusion of HDPE, HDPE, LLDPE;
(iv) PST/INK/LDPEI Coextrusion of HDPE, HDPE, LLDPE; or Polypropylene (e.g., OPP)/LDPE/Coextrusion of HDPE, HDPE, LLDPE;
(v) PST/HDPE/LLDPE, e.g., by Coextrusion.

Specific such laminate structures can be illustrated by reference to FIG. 1, which shows a 4-layer laminate. It will be appreciated that the number of layers could be fewer or greater and still be within the precepts of the present disclosure. A laminate structure, 10, is seen to include 4 layers, to wit, an outer layer, 12, a second layer, 14, a third layer, 16, and an inner layer, 18. As an example of a laminate structure according to the present disclosure, the outer layer is the crystal PST layer, the second layer is white/clear LDPE, the third layer is foil, and the inner layer is a sealant layer. It will be appreciated that a wide variety of combinations are available to the industry based on the present disclosure, this combination being by way of example and not by way of limitation.

The manner of preparation of the polystyrene lamination film is polymer extrusion preferably by the cast/oven tentering film process, and alternatively by the film process with the capability of in-line and/or off-line orientation of the bubble. The cast/tentering film process comprises both machine direction (MD) and cross-machine direction orientation (TD), either sequential or simultaneous, whereby the film properties are created. In all cases the polystyrene blend is heated and melted into a uniform state and subsequently pumped through a die onto a cooled roll or air-ring where the molten polymer is quenched.

In a second step the polystyrene blend is immediately oriented or stretched in the viscoelastic state to create higher film tensile properties suitable for the application. The oriented film then is quickly heat set by rapid quenching with both cooled air and chilled rolls to preserve the degree of orientation in both MD and TD directions. This stretching process quickly reduces the film thickness and also dramatically raises the film's tensile properties. Stretching ratios can be varied mechanically by reducing processing roll speeds and chain speeds in the tenter oven to optimize film characteristics. Roll and oven temperatures are fine tuned to give normal throughputs from the input to the extruder to the exit of the oven tenter and finally the film winder. All speeds are carefully matched to create a stable process with low variation.

In aforementioned case of a cast/stretching line, generally a die and a casting roll of uniform surface properties and uniform temperature, and also configured sequentially with series of stretching rolls capable of both heating and cooling the polystyrene blend to ultimately create a polystyrene lamination film. This is done as Step One of the process in a very controlled manner that allows the polystyrene blend to be a uniform width and temperature that achieves the desired viscoelastic state for stretching in the machine direction. This temperature also is carefully managed, as are the speeds of the rolls, so the film is drawn longitudinally as a ribbon of hot plastic in a rubbery state, no hotter than 350° F. and ideally between 250° and 300° F.

Subsequent to the MD stretching with rolls at uniform temperatures, the polystyrene blend is introduced manually to a stretching oven at uniform temperatures to quickly stretch the hot MD oriented ribbon with a set of chains in a rail, and this is Step Two of the stretching process. In the length of the tentering oven the hot ribbon is now stretched laterally (TD) and at increasing ratios to allow the final film thickness to be quickly reached. The thickness is achieved by adjusting the width of the stretching machine mechanically; narrow at the entrance and wide at the exit, so that high stretching ratios are reached at the oven exit. High stretching ratios are desired for creating the highly oriented polystyrene lamination film with uniform tensile properties. The oven temperatures also are carefully managed from end to end so that the hot plastic is drawn in a rubbery state no hotter than 350° F. and ideally between 250° and 300° F. After oven stretching the thin lamination film is now quickly cooled to preserve the high degree of orientation and the "stresses" in the individual polystyrene blend components critical to the end use. Winding the lamination film on a high-speed mandrel is the final step after uniform temperatures and speeds are reached and the process is stable.

The resultant polystyrene lamination film possesses unique properties due to the degree of molecular orientation and the manner in which it was stretched. An equipment operator practiced in the art of film manufacture will adjust the ratios or degree of stretch to create more or less orientation in MD or TD directions. Unique film properties are thereby created, such as but not limited to: higher orientation of the molecular structure in the TD or cross machine direction. This molecular structure is subsequently quenched so that the orientation is preserved and can be measured. The "unbalanced" nature of this orientation also creates a polystyrene lamination film with tear properties that propagate in one direction. The higher the percentage stretch in the TD (cross) direction, the greater the now inherent polystyrene film tear properties will propagate very uniformly in the same direction. This unique property has benefits for film converters who wish to create products with controlled degree of tear for a variety of consumer applications, such as, but not limited to: confectionary pouches, candy wrappers, and individually sized condiment packs. This polystyrene film tear property also is highly preserved in the lamination process and in combination with a variety of other materials such as foil, polyethylene films and extrudates, adhesives, and seal resins such as Surlyn® resin (E. I. Du Pont De Nemours And Company Corporation) and metallocene LLDPE. This "Easy Tear" property is exclusively related to the ease at which the polystyrene lamination film will (1) initiate a tear at an edge and subsequently (2) propagate a tear without mechanical assistance such as laser scoring.

Figure 2:
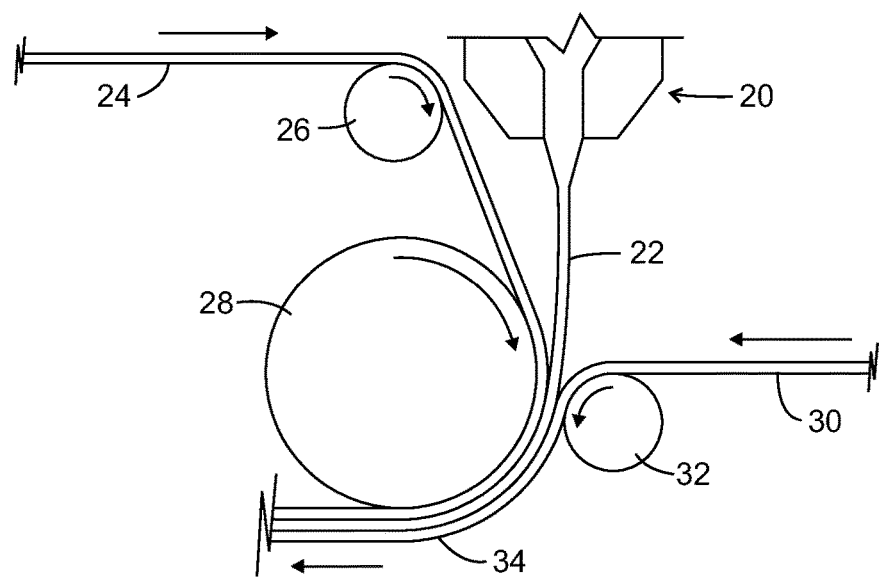
FIG. 2 illustrates a cast/oven tentering film process.

The next step in the process is to form the laminate structure by one of a variety of processes, such as, for example, extrusion coating/lamination using a wet lamination or dry lamination process, co-extrusion or other conventional or non-conventional process. Examples of these processes are illustrated in FIGS. 2-5. In particular, FIG. 2 shows a 3-ply laminate version. In particular, from an extruder, 20, a film, 22, exits. A first substrate film, 24, is pulled in the direction of the arrow over a first roller assembly, 26, and onto a heated roller, 28. A second substrate film, 30, is pulled over a second roller assembly, 32, in the direction of the arrow. Films 22, 24, and 30 form a laminate structure, 34, as they are pulled over heated roller assembly 28 to form a laminate of the present disclosure. It will be appreciated that any of the films 24 and 30 can be laminate film structures themselves for forming a multi-laminate structure.

Figure 3:
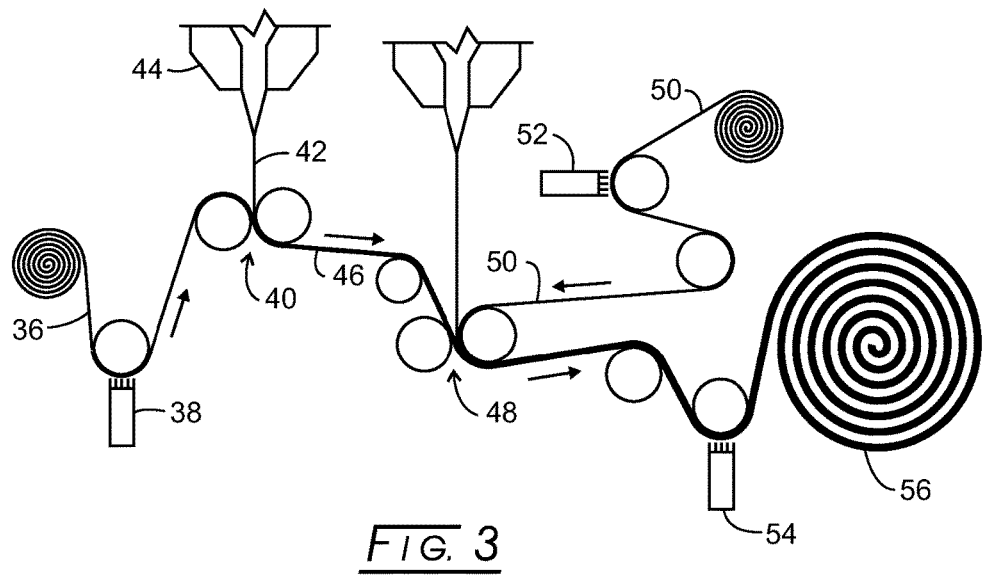
FIG. 3 illustrates a co-extrusion line.

FIG. 3 depicts a co-extrusion line that uses ozone and surface treatment stations. In particular, a film, 36, passes through a first ozone treatment station, 38, and over a roller station, 40, where an extrudate film, 42, exits an extruder, 44. A film, 46, from a first ozone treatment station 38 next passes through a second, ozone surface treatment station, 48, where it meets a film, 50, which as passed through a second surface treatment station, 52. The combined film from second surface treatment station 52, then, passes through a third surface treatment station, 54, and thence is taken up into a roll, 56.

Figure 4:
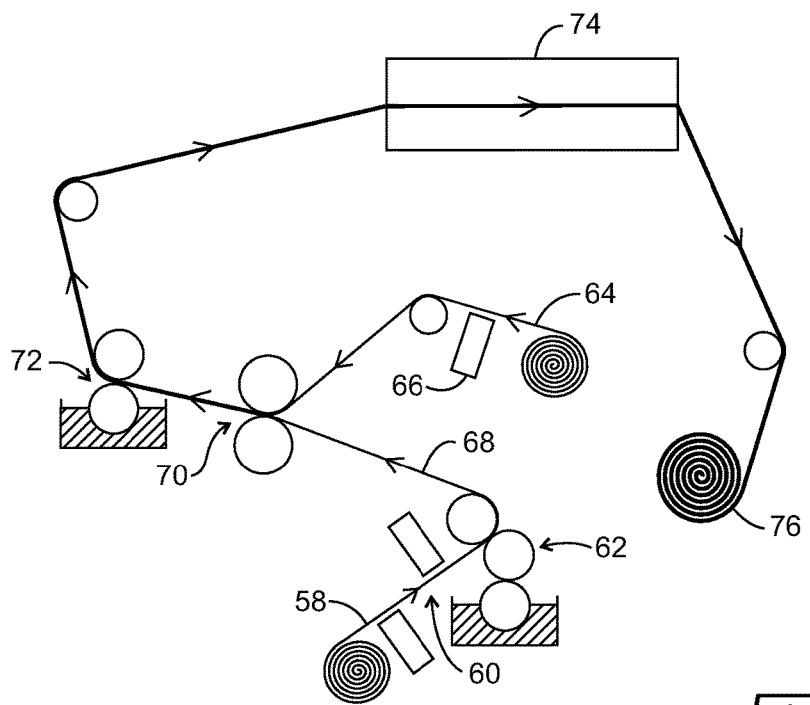
FIG. 4 illustrates a wet lamination process.

FIG. 4 shows a wet lamination line, in which a first web or film, 58, unwinds and passes through a treatment section, 60, and has adhesive applied to one side by an adhesive station, 62. A second web or film, 64, unwinds and passes through a treatment section, 66. Treated web 64 and an adhesively coated web, are joined in a nip roller assembly, 70 and then through a lacquer application station, 72. The joined webs then pass through a drying station, 74, and around a rewind station, 76.

Figure 5:
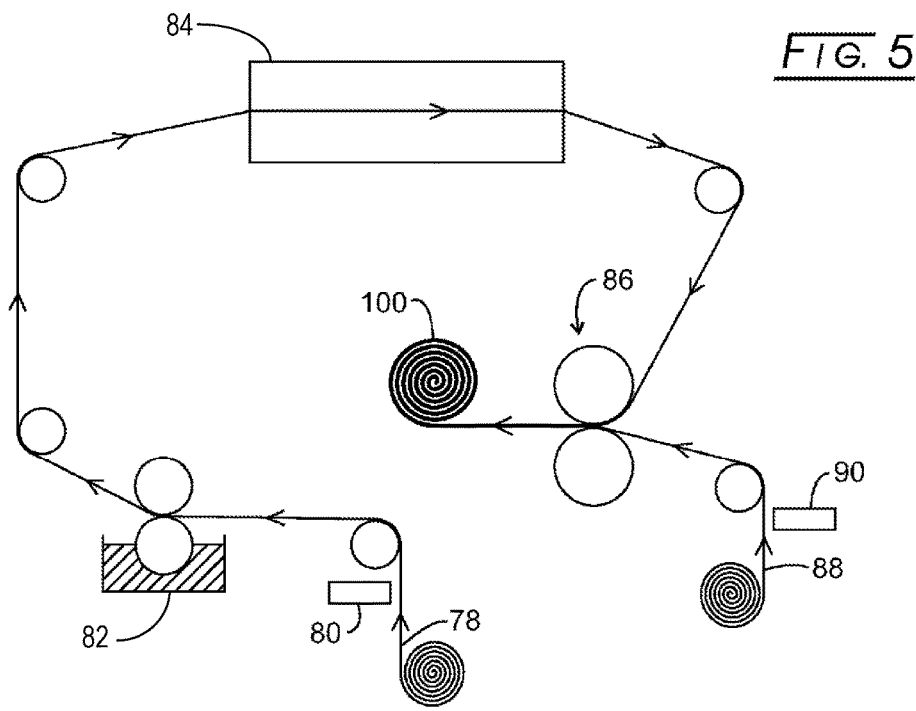
FIG. 5 illustrates a dry lamination process.

FIG. 5 illustrates a dry lamination line, where a web or film, 78, unwinds from a spool and passes through a first treatment station, 80, and then through an adhesive station, 82, where an adhesive is applied to one of its sides. The adhesively coated web then may pass through an application roll (e.g., gravure) and thence through a drying tunnel, 84. The dried web then passes through a nip roller station, 86, where it is combined with a second web, 88, that itself has passed through a treater, 90. A spool assembly, 100, then takes up the combined web laminate.

Figure 6:
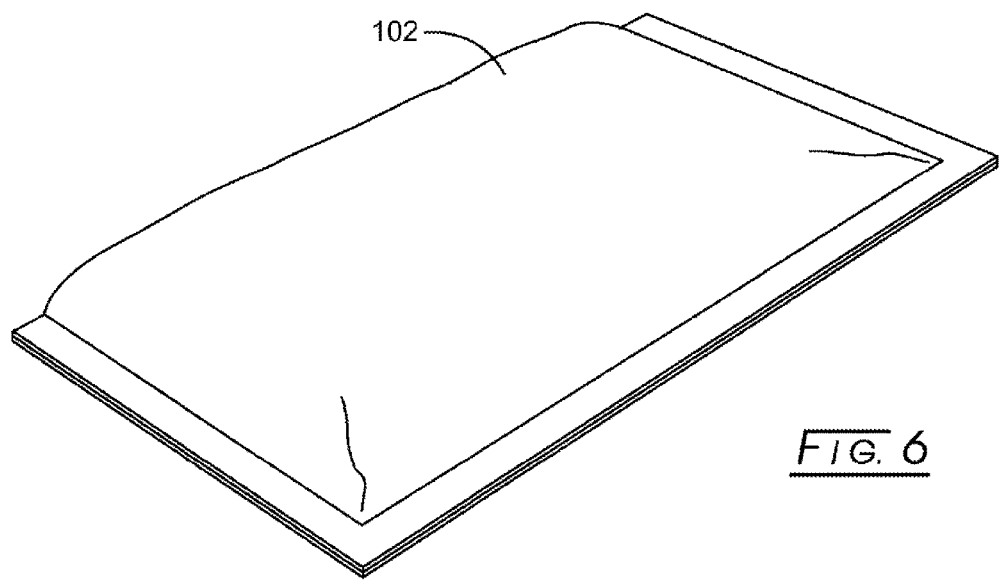
FIG. 6 is an example of a single sachet pouch that can be made using the disclosed PST laminate.

A typical sachet, 102, for example, is illustrated in FIG. 6. Other sizes and configures, colors, etc., can be manufactured using the disclosed PST laminate in accordance with the precepts set forth herein.

While the device has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the US engineering system and all amounts and percentages are by weight, unless otherwise expressly indicated. Also, all citations referred herein are expressly incorporated herein by reference.

I claim:

1. A sachet with at least one film configured to be torn by hand, the film comprising a polymeric laminate structure with an outer crystal polystyrene homopolymer layer laminated to at least two additional polymeric layers.

2. The sachet of claim 1, wherein said outer crystal polystyrene homopolymer layer comprises at least about 55 wt-% of said crystal polystyrene homopolymer and up to about 45 wt-% of one or more of butadiene or inorganic fillers.

3. The sachet of claim 1, wherein said outer crystal polystyrene homopolymer layer is blended uniformly with between 0.25 and 20 weight percent of one or more of polypropylene, high-density polyethylene, ethylene vinyl acetate copolymer, or polyethylene.

4. The sachet of claim 1, wherein from outer layer to inner layer, the polymeric laminate structure comprises: a first layer comprising crystal polystyrene homopolymer, a second layer comprising polyethylene, a third layer comprising high density polyethylene, and a fourth layer comprising linear low density polyethylene.

5. The sachet of claim 1, wherein from outer layer to inner layer, the polymeric laminate structure comprises: a first layer comprising crystal polystyrene homopolymer, a second layer comprising polyethylene, a third layer comprising polyester, a fourth layer comprising polyethylene, a fifth layer comprising at least one high density polyethylene, and a sixth layer comprising linear low density polyethylene.

6. The sachet of claim 1, wherein the outer crystal polystyrene homopolymer layer has a higher degree of molecular orientation in the cross-machine direction than the machine direction, which results in tear properties that propagate more readily in one of said directions.

7. The sachet of claim 6, wherein the tear properties propagate more readily in the cross-machine direction.

* * * * *